US007926104B1

(12) United States Patent
Sundaram et al.

(10) Patent No.: US 7,926,104 B1
(45) Date of Patent: Apr. 12, 2011

(54) METHODS AND SYSTEMS FOR NETWORK ATTACK DETECTION AND PREVENTION THROUGH REDIRECTION

(75) Inventors: Ravi Sundaram, Cambridge, MA (US); Walter C. Milliken, Dover, NH (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 1239 days.

(21) Appl. No.: 10/826,897

(22) Filed: Apr. 16, 2004

Related U.S. Application Data

(60) Provisional application No. 60/463,276, filed on Apr. 16, 2003.

(51) Int. Cl.
*G06F 12/14* (2006.01)
*G06F 11/30* (2006.01)
*G06F 15/16* (2006.01)
*H04L 29/06* (2006.01)

(52) U.S. Cl. ........... 726/22; 713/151; 713/162; 709/245
(58) Field of Classification Search .................... 726/22; 713/151, 162; 709/245
See application file for complete search history.

(56) References Cited

U.S. PATENT DOCUMENTS

| 5,815,664 | A  | * | 9/1998  | Asano ........................... 709/227 |
| 5,930,497 | A  | * | 7/1999  | Cherian et al. .................. 703/21 |
| 6,085,215 | A  | * | 7/2000  | Ramakrishnan et al. ...... 718/102 |
| 6,286,045 | B1 | * | 9/2001  | Griffiths et al. ............... 709/224 |
| 6,311,165 | B1 | * | 10/2001 | Coutts et al. ..................... 705/21 |
| 6,470,389 | B1 | * | 10/2002 | Chung et al. ................... 709/227 |
| 6,941,368 | B1 | * | 9/2005  | Hamzy et al. .................. 709/225 |
| 6,980,550 | B1 | * | 12/2005 | Yip et al. ....................... 370/392 |
| 2003/0055979 | A1 | * | 3/2003 | Cooley .......................... 709/227 |
| 2003/0079017 | A1 | * | 4/2003 | Agrawal et al. ............... 709/226 |
| 2003/0179750 | A1 | * | 9/2003 | Hasty et al. .................... 370/390 |
| 2004/0019781 | A1 | * | 1/2004 | Chari et al. ................... 713/153 |
| 2004/0103314 | A1 | * | 5/2004 | Liston ........................... 713/201 |
| 2005/0076139 | A1 | * | 4/2005 | Jinmei et al. .................. 709/245 |

OTHER PUBLICATIONS

Bruce Schneier ("Applied Cryptography: protocols, algorithms, and source code in C", 2nd edition, published Oct. 1995).*
Droms, R. "Dynamic Host Configuration Protocol," RFC 2131, Mar. 1997, pp. 1, 13-33.*

* cited by examiner

*Primary Examiner* — Michael Pyzocha

(57) ABSTRACT

Methods and systems for detection and/or prevention of network attacks can include the use of multiple and/or time-dependent addresses coupled with filtering by the directory or naming service. The directory service can respond to requests for the address of a resource by returning an address that can be relocated over time by coordinating the directory service entry with the host and network address configuration data and/or by returning an address specific to the requestor. Thus, the directory service can track and build profiles of matches between requestors and accesses. The methods and systems can use the time dependent addresses and profiles to distinguish legitimate accesses from unauthorized or malicious ones. Requests for non-valid addresses can be misdirected to "empty" addresses or to detection devices.

56 Claims, 3 Drawing Sheets

US 7,926,104 B1

METHODS AND SYSTEMS FOR NETWORK ATTACK DETECTION AND PREVENTION THROUGH REDIRECTION

RELATED APPLICATIONS

This application claims priority to, and incorporates by reference, the entire disclosure of U.S. Provisional Patent Application No. 60/463,276 filed on Apr. 16, 2003.

FIELD

The methods and systems relate generally to communication networks, and more particularly to methods and systems for detection and/or prevention of unauthorized access or attacks on such networks.

BACKGROUND

While providing easy access to information, network systems, such as the Internet or intranets, can be vulnerable to attacks seeking to disrupt network operations or gain unauthorized access to sites on the network. Current attack detection techniques can rely on detecting malicious actions on the target network or system, or detecting network traffic associated with potential attacks (e.g., port scans) using various types of intrusion detection systems. Detecting malicious actions can require detecting possible attack behaviors and distinguishing them from "normal" behaviors on the host computer. Accurately categorizing the large numbers of both malicious and normal behaviors that can be used can be a daunting task. Thus, such detection techniques can have high false alarm rate, i.e., detecting normal behavior as malicious, and/or high false negative rate, i.e., missing malicious behavior or misidentifying it as normal.

Network-based intrusion detectors can detect rapid port scans that can be associated with an attack on a network. Such attacks can attempt to quickly scan a directory or naming service to obtain lists of network addresses (referred to hereinafter merely as "addresses" or "an address") to be targeted for attacks. The intrusion detecting systems can recognize the rapid scanning for addresses as a prelude to future attacks and can seek to prevent the attacks by refusing access to the addresses and/or identifying the source of the address queries for further disciplinary actions, such as shutting down or quarantining the source. However, such intrusion detection systems can tend to miss slow scans accomplished over a period of days or weeks.

SUMMARY

Methods and systems for detection and/or prevention of network attacks can include the use of multiple and/or time-dependent addresses coupled with filtering by the directory or naming service. The directory service can respond to requests for the address of a resource by returning an address that can be relocated over time by coordinating the directory service entry with the host and network address configuration data and/or by returning an address specific to the requestor. Thus, the directory service can track and build profiles of matches between requestors and accesses. The methods and systems can use the time dependent addresses and profiles to distinguish legitimate accesses from unauthorized or malicious ones. Requests for non-valid addresses can be misdirected to "empty" addresses or to detection devices.

In one embodiment, a method of detecting unauthorized access attempts to a network can include receiving a request from a user to obtain an address, obtaining the address, applying a function (e.g., mathematical scheme that may be implemented using computer instructions, etc.) to the address to obtain a return address corresponding to one of a block of addresses, returning the return address to the user, monitoring access to the address, and detecting an unauthorized attempt to access the address when an attempted address does not correspond to the return address. The function applied can include a hash of a user address and/or a hash of the time the request was made. Values of the hash can map to the block of addresses.

In one aspect, the function can include changing the address to be returned over time. The time period over which the address is changed can be pre-selected or randomly determined. The method can determine the attempt is authorized when a connection exists between the user and the unused address when the address is changed over time. Changing the address over time can include coordinating changes in a name-to-address database and a host identity-to-address database. The address can be changed by randomly choosing the return address from the block of addresses. In one aspect, detecting can include tracing the user and blocking additional unauthorized attempts by the user. In one aspect, the addresses of the block of addresses not returned to the user can include attack detectors.

In one embodiment, computer-readable medium can contain instructions for controlling a processor to detect unauthorized access attempts to a network by receiving a request from a user to obtain an address, obtaining the address, applying a function to the address to obtain a return address, the return address corresponding to a used one of a block of addresses, returning the return address to said user, monitoring access to the address, and detecting an unauthorized attempt to access the address when an attempted address corresponds to an unused one of the block of addresses.

The computer-readable medium can include instructions for controlling a processor to apply the function by hashing a user address of the user and/or a time of the request to obtain one value of a range of values mapping to the block of addresses, the one value designating the used one of said block of addresses. In one aspect, the instructions can include instructions to trace the user when the attempted address corresponds to the unused one of the block of addresses. The instructions can include instructions to block additional unauthorized attempts when the attempted address corresponds to the unused one of the block of addresses.

The computer-readable medium can include instructions for controlling a processor to apply the function by changing the used one of the block of addresses over time. The instructions can control a processor to change using a pre-selected time period and/or a random time period. The instructions can control a processor to change by randomly choosing the used one from the block of addresses. The instructions to change can include instructions to coordinate changes in a name-to-address database and a host identity-to-address database. The method can determine the attempt is authorized when a connection exists between the user and the unused address when the address is changed over time.

In one embodiment, a system for detecting unauthorized access attempts to a network can include means for receiving a request from a user to obtain an address, means for obtaining the address means for applying a function to the address to obtain a return address corresponding to a used one of a block of addresses, means for returning the return address to said user, means for monitoring access to the address, and means for detecting an unauthorized attempt to access the address when an attempted address corresponds to an unused one of the block of addresses. The means for applying can include means for hashing a user address of the user and/or a time of the request to obtain one value of a range of values mapping to the block of addresses, the value designating the used one of the block of addresses.

The means for detecting can include means for tracing the user when the attempted address corresponds to the unused one of the block of addresses. The means for detecting further can include means for blocking additional unauthorized attempts when the attempted address corresponds to the unused one of the block of addresses. The means for applying can include means for changing the used one of the block of addresses over time. The means for changing can include means for determining a time period using a pre-selected time period and/or by generating a random time period. The means for changing can include means for randomly choosing the used one from the block of addresses. The system can include a name-to-address database, a host identity-to-address database, and means to coordinate the changes over time in the databases. The system can include means for determining the attempt is authorized when a connection exists between the user and the unused address.

In one embodiment, a computer program, disposed on a computer readable medium, can enable detection of unauthorized access attempts to a network. The computer program can include instructions for causing a processor to receive a request from a user to obtain an address, obtain the address, apply a function to the address to obtain a return address, the return address corresponding to a used one of a block of addresses, return the return address to the user, monitor access to the address, and detect an unauthorized attempt to access the address when an attempted address corresponds to an unused one of the block of addresses.

The instructions can include instructions for causing a processor to hash a user address of the user and/or hash a time of the request to obtain one value of a range of values mapping to the block of addresses, the one value designating the used one of the block of addresses. The instructions for causing a processor to detect can include instructions for causing a processor to trace the user when the attempted address corresponds to the unused one of the block of addresses. The instructions can include instruction for causing a processor to block additional unauthorized attempts when the attempted address corresponds to the unused one of the block of addresses. The computer program can include instructions for causing a processor to correspond the unused ones of the block of addresses with attack detectors.

The instructions for causing a processor to apply the function can include instructions for causing a processor to change the used one of the block of addresses over time. The instructions for causing a processor to apply the function can include instructions for causing a processor to use a pre-selected time period for changing the one of the block of addresses and/or to generate a random time period for changing the one of the block of addresses. The instructions for causing a processor to change the used one of the block of addresses can include instructions for causing a processor to randomly choose the used one from the block of addresses. The instructions can include instructions to coordinate the address change in a name-to-address database and a host identity-to-address database. The instructions can include instructions to determine the attempt is authorized when a connection exists between the user and the unused address. The computer program can include instructions for causing a processor to trace the user and to block additional unauthorized attempts when the attempted address corresponds to the unused one of the block of addresses.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

Figure 1:
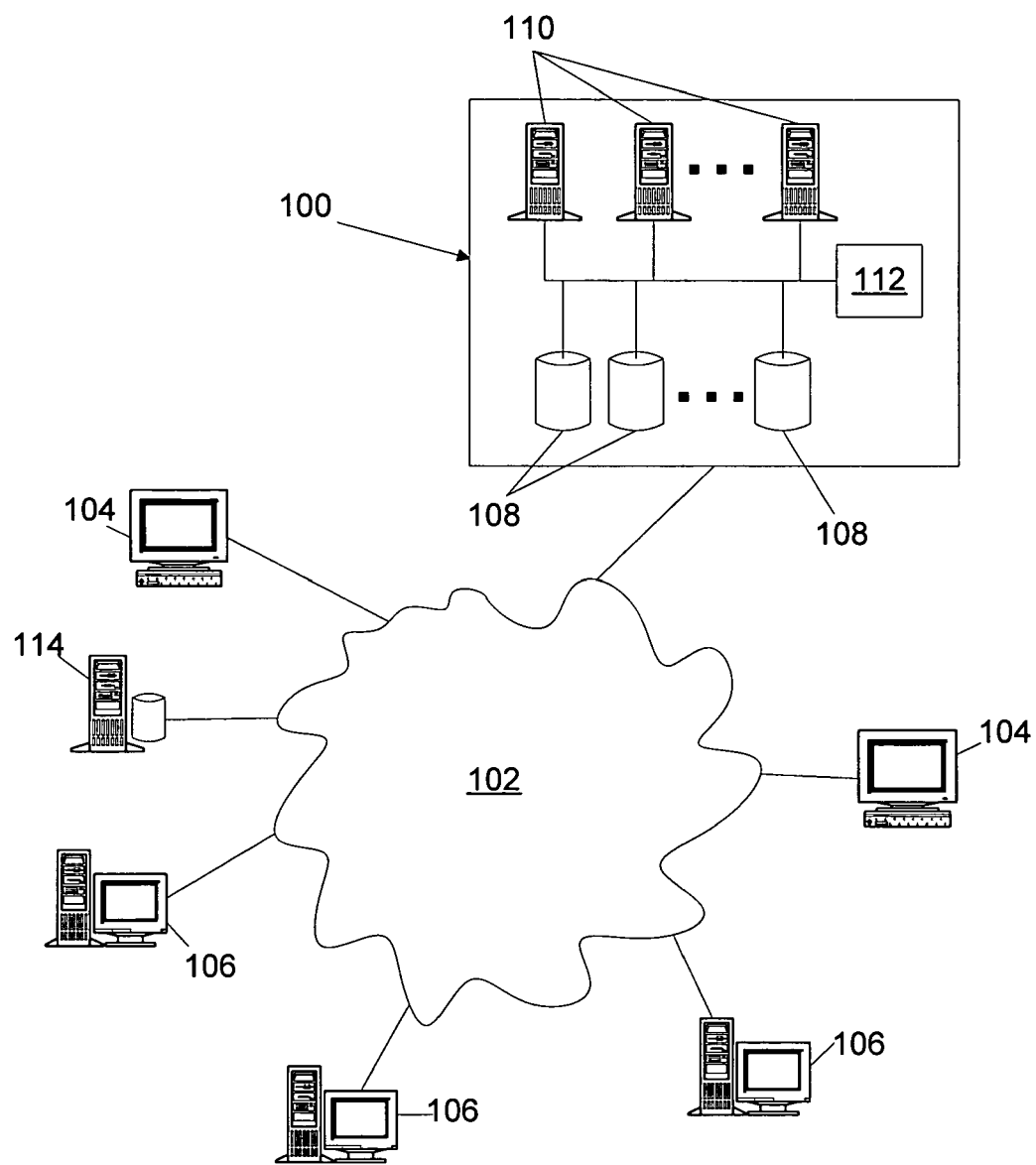
FIG. 1 illustrates a block diagram of an exemplary system for detection of unauthorized access attempts to a network.

Referring to FIG. 1, a system 100 can be configured for detection and prevention of attacks on a network 102, such as the Internet, an intranet, a Wide Area Network (WAN), a Local Area Network (LAN), or other network as known in the art. System 100 can connect to network 102 and can respond to requests from network users, such as user 104, for addresses of resources 106 connected to the network. System 100 can include one or more directories 108 of addresses for resources 106 and one or more servers 110 that can process the requests.

Figure 2:
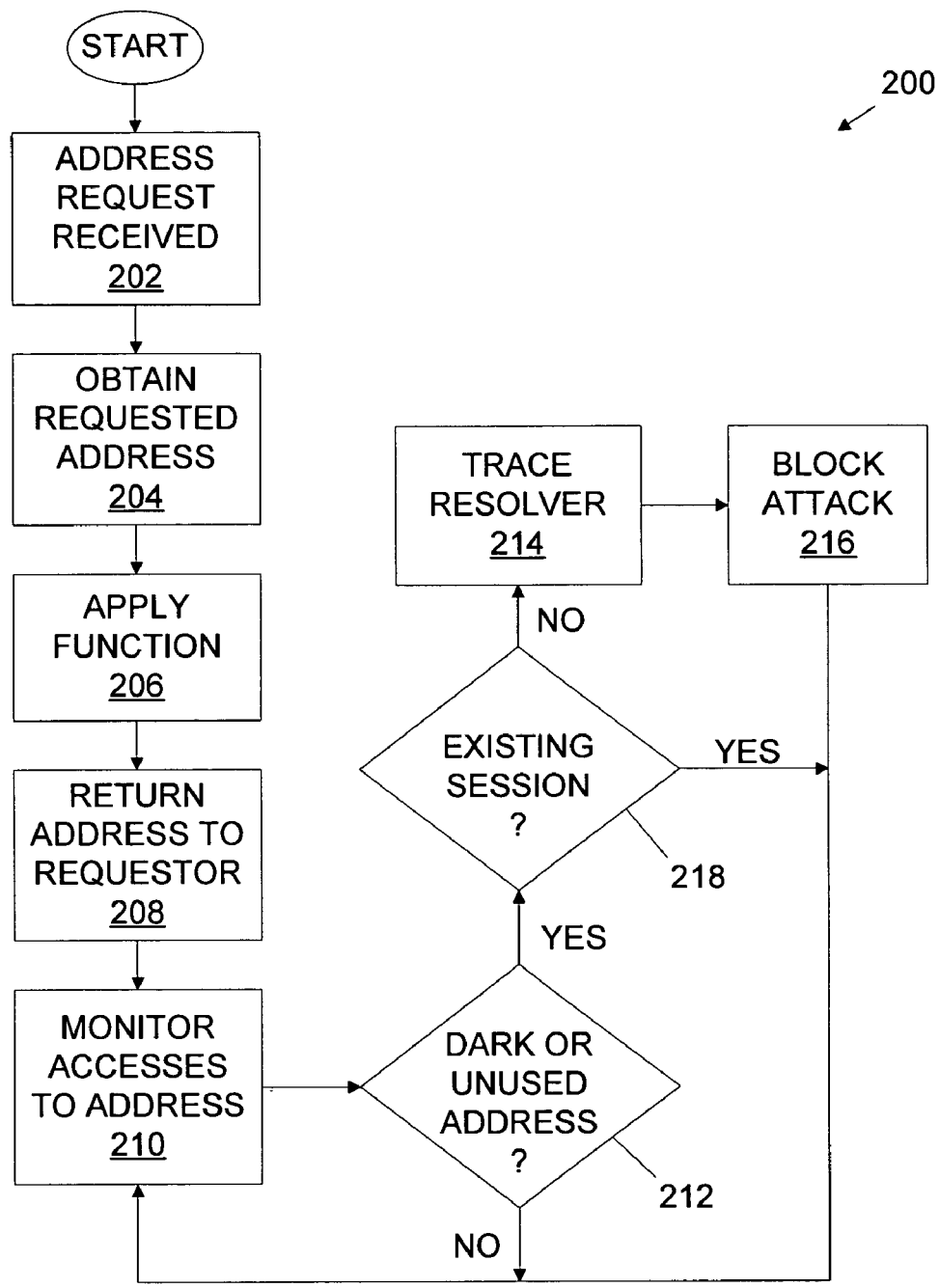
FIG. 2 illustrates a flow diagram of a method of detecting unauthorized access attempts to a network.

System 100 can implement a method 200, illustrated in FIG. 2, of using multiple addresses coupled with filtering by system 100 to detect malicious access attempts. In general, system 100 can respond to requests for the address of a resource 106 by returning an address that is specific to the user, or requestor 104. In this way, system 100 can track and build profiles of matches between requestors and accesses and can distinguish legitimate accesses from malicious ones. Such a scheme can be applicable to the commonly used Internet Protocol (IP) address-space and Domain Name System (DNS) directory mechanism of the Internet as well proprietary addressing schemes or other directory services including Lightweight Directory Access Protocol (LDAP) for use on the Internet or other networks. As used herein, references to IP addresses, DNS directory mechanisms and the Internet can be understood to include other addressing schemes, directory services, and/or networks, as may be known to those of skill in the art.

In one embodiment, method 200 can relocate the IP address of the target destination over time, by coordinating the directory service entry with the host (resource) and network address configuration data. It is known that attacks on a network, such as network 102, can often be characterised by random accesses, either during the actual attack or during a reconnaissance phase. Such random accesses can be detected by the use of dark address space and by noting the probes that show up at the dark address space. Additionally, attacks can also be characterised by spoofed source addresses, especially in the case of stateless attacks. One known example of using spoofed source addresses includes the case of the Slammer worm. Spoofing can be detected and prevented at the point when the directory is looked up for the IP of the resource.

The use of dark space and requestor-specific address resolution can assist in detecting attempts at malicious or unauthorized access to network 102 or resources 106 on network 102. Referring more particularly to FIG. 2, method 200 can begin at 202 when a request is made for an address, for example from a DNS. Rather than associating a single IP address with a resource 106, system 100 can provision a large block of IP addresses such as a /24 or 256 IP addresses. As an example using standard IP prefix notation, "41.5.63.0" can signify an address for a resource 106, referred to hereafter as the requested address, and "41.5.63.0/24" can signify the block of 256 addresses for that resource 106.

When the address request is made at 202, the system 100 can obtain the requested address (204) and can apply a function to the requested address (206) to obtain an address to be returned to the requestor (208), referred to hereafter as a return or returned address. The function can uniquely identify the returned address with the address request. In some embodiments, the return address can be a function of the time the request was received and/or of the requestor's IP address, e.g., a hashing function. Using the above example of the 256 IP addresses for the block of IP addresses, the requestor's IP address and the time of request can be hashed to a number between 0 and 255 to obtain a value that can be associated, or mapped, with one address of the block of IP addresses, say 129, so as to provide a return address of 41.5.63.129.

The use of the requestor's IP address in providing the returned address can effectively eliminate access by spoofed source addresses. By using the time of the request to generate the return address, the return address can include a predetermined time period during which the requestor can utilize the return address to access the resource 106 associated with the requested address. As described previously, legitimate accesses typically can first query the DNS or authoritative name-server 110 and then can access the correct IP(s) within a short time period, e.g., a few seconds. The predetermined time period can be selected to be greater than typical query-access time periods for legitimate accesses. This effectively renders the rest of the space "dark" to that requestor over the predetermined time period. While a first access can typically occur within a few seconds, browsers can reuse the access connection for multiple page fetches from the same server. In some cases, session duration can be longer-lived, in the order of hours or up to a day or two. The time period for access can thus depend on the applications expected to access the address.

The method 200 can monitor the accesses (210) at least over the entire range, or block of addresses. If an attempt to access one of the "dark" addresses, as determined at 212, the access can be categorized as an illegitimate access. In one embodiment, system 100 can include access control lists at the name-server 110. It is possible that a hack attempt can first query the authoritative name-server 110. However, by implementing access control lists, method 200 can trace (214) the offending resolver and block (216) the attack if required. It can be understood that the use of access control lists can be predicated on the set of allowed resolvers being controlled and private.

In one embodiment, the function applied at 206 can include periodically changing the resource address over time. Such a function can be useful against attacks that "scan" the address space and return at a later time with attacks on the target machines located by the scanning process. As noted earlier, it is known in the art that legitimate traffic can be characterized by using the name service, such as server 110, to look up a resource address, followed by sending traffic to that address within a short time period. Malicious scanning can generally be performed long before the actual attack, in order to hide from existing detection mechanisms. Though, typically, malicious attacks can bypass using the directory service.

Thus, the address for a resource 106 can change between the time of scan and the actual attack and the attack can thus be directed against the wrong target machine. If the computer systems to be protected are part of a sparsely-allocated address space, the attack can likely occur against a currently-unused address. An attack detector 112, shown in FIG. 1, can be associated with currently-unused addresses. Referring back to FIG. 2, the method 200 can determine, at 212, if the access monitored at 210 is to an unused address, or to an attack detector 112. Attack detector 112 can take appropriate action to trace (214) the requestor and/or to block (216) the access. Attack detector 112 can include known Intrusion Detection Systems (IDS's) and/or a honeypot system that mimics a host's capabilities, but contains additional intrusion defenses and/or misleading or unimportant data that can detain the attacker to provide time and information for tracking the attacker.

Implementing the periodic changing of resource addresses can require coordinating the address records maintained by the directory service with the actual host and network configuration. In many cases, this can be implemented by coordinating changes in the directory service records in server 110 (e.g., in a DNS server) with similar changes to dynamic address-configuration service records on host server 114 (e.g., in a Dynamic Host Configuration Protocol (DHCP) server). Existing network connections, such as Transmission Control Protocol (TCP) connections, can continue to use old network addresses until connections using such old addresses terminate. Thus, the network 102 and host computer, such as server 114, can be configured to continue to accept old addresses.

The timing of the address changes, or changes in the directory service records and/or the dynamic address-configuration service records, can vary to suit network parameters. For example, changes can be made as frequently as hourly. The factors and/or parameters affecting the timing of the changes can include the types of services in use, the typical session times for the services, and/or the rate of port scans that the IDS can detect directly. Generally, the timing can be such that the address can be stable across the longest typical user session time, but yet can migrate at a rate faster than a slow port scan by an attacker.

Figure 3:
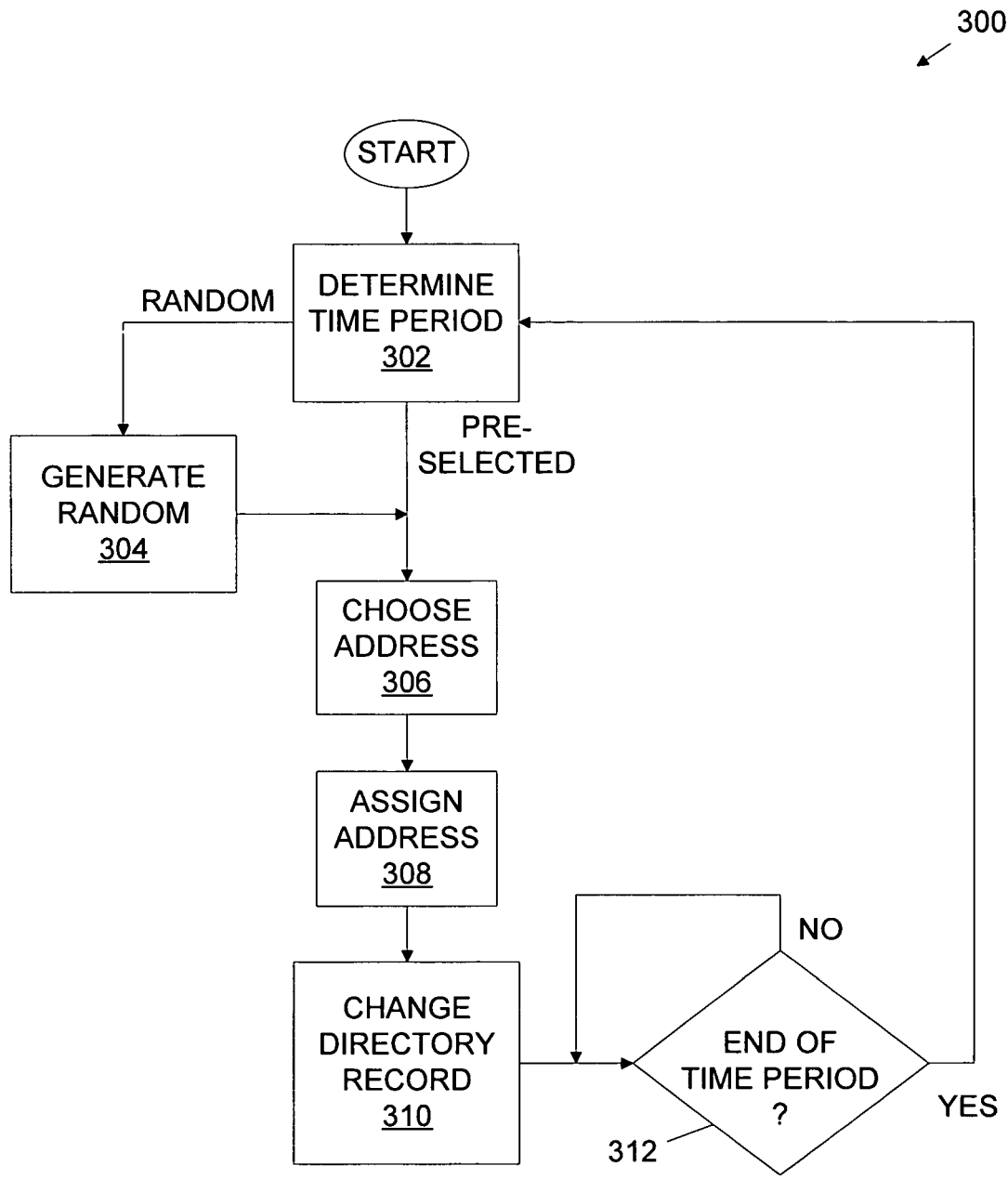
FIG. 3 illustrates a flow diagram of a method of providing return addresses to requests for network addresses.

FIG. 3 can illustrate a flow chart for an address-movement method 300 that can implement applying the function at 206 of FIG. 2. In assigning new addresses, method 300 can avoid reassigning such "in-use" addresses to a different system. In addition, the host systems and network using method 300 can be configured to support multiple addresses for host systems using known multiple-address features currently available on existing network devices and host computer operating systems.

Referring to FIG. 3, method 300 can determine a time period for assigning addresses at 302. The time period can be a pre-selected time period, e.g., one hour, or can be a random period of time, as generated at 304 using a known random number generator applied to provide a range of time periods. Method 300 can choose an address (306) for a host, or target machine, from a pool of currently-unassigned addresses. The address may be chosen randomly to inhibit prediction of the target machine's addresses at future times of attack. The chosen address can be assigned (308) to the target machine for the determined period of time. The directory record can be changed to match the new address and given a lifetime equal to the address-assignment period (310) so as to prevent caching of the directory record by hosts or subordinate directory servers or caches past the lifetime of the assigned address. When the determined time period is elapsed, as determined at 312, method 300 can loop to determine a next time period at 302.

Changing the directory record can include changing both the DNS record (the name to IP address database) and the DHCP record (the host identity to IP address database). Data from DHCP and DNS queries can have a specified lifetime. The timing of the changeover in the directory record can be based on this mechanism. However, to accommodate "in progress" sessions at the changeover time, the host can be configured to accept the "old" address until existing sessions terminate, as indicated at 218 in FIG. 2, (e.g., the TCP connections using that "old" address have closed), while only accepting new sessions at the "new" address.

The methods and systems disclosed herein can be applicable for detection and/or prevention of attacks in a variety of networks. However, as the disclosed methods and systems include the use of multiple and/or time-dependent addresses, the number of possible addresses on the network can determine the effectiveness of the techniques described herein. For example, the number of (upper) valid address bits in the address for Internet Protocol (IP) v4 is 32 bits, while for IP v6, the number is 128 bits. Thus, IP v6 provides for $2^{96}$ times as much address space as IP v4, making the address space for IP v6 sparsely populated, and providing greater address space for use by the methods and systems described herein.

In addition, the techniques described herein can be implemented in hardware or software, or a combination thereof. The systems and methods can be implemented in one or more computer programs executing on one or more programmable computers, such as may be exemplified by servers 110 and/or 114, among others, that include a processor, a storage medium readable by the processor (including volatile and non-volatile memory and/or storage elements), one or more input devices, and one or more output devices.

The computer programs, or programs, may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. As an example, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A processor-implemented method of detecting unauthorized access attempts to a network, comprising:
   receiving a request from a user at a user address to obtain a target address;
   obtaining said target address;
   generating via a processor a substitute return address corresponding to output of a function applied to said target address and to said user address, said substitute return address corresponding to a used one of a block of substitute addresses;
   returning said substitute return address to said user;
   monitoring access to said target address; and
   detecting an unauthorized attempt to access said target address when an attempted address corresponds to at least one unused substitute address of a group of unused substitute addresses in said block of substitute addresses, wherein said group of unused substitute addresses is user-specific.

2. The method according to claim 1, wherein said function further comprises hashing said user address of said user to obtain one value of a range of values mapping to said block of substitute addresses, said one value designating said used one of said block of substitute addresses and designating said group of unused substitute addresses by exclusion.

3. The method according to claim 2, wherein said function further comprises hashing a time of said request.

4. The method according to claim 2, wherein detecting comprises tracing said user when said attempted address corresponds to said unused one of said block of substitute addresses.

5. The method according to claim 4, comprising blocking additional unauthorized attempts when said attempted address corresponds to said unused one of said block of substitute addresses.

6. The method according to claim 4, wherein unused ones of said block of substitute addresses correspond to attack detectors.

7. The method according to claim 1, wherein said function further comprises hashing a time of said request to obtain one value of a range of values mapping to said block of substitute addresses, said one value designating said used one of said block of substitute addresses.

8. The method according to claim 1, wherein said function further comprises changing said used one of said block of substitute addresses over time.

9. The method according to claim 8, wherein said function further comprises determining a time period for changing said one of said block of substitute addresses.

10. The method according to claim 9, wherein determining the time period comprises using a pre-selected time period.

11. The method according to claim 9, wherein determining the time period comprises generating a random time period.

12. The method according to claim 8, wherein changing said used one of said block of substitute addresses comprises randomly choosing said used one from said block of substitute addresses.

13. The method according to claim 8, wherein detecting comprises tracing said user when said attempted address corresponds to said unused one of said block of substitute addresses.

14. The method according to claim 13, comprising blocking additional unauthorized attempts when said attempted address corresponds to said unused one of said block of substitute addresses.

15. The method according to claim 13, wherein unused ones of said block of substitute addresses correspond to attack detectors.

16. The method according to claim 8, further comprising determining said attempt is authorized when a connection exists between said user and said unused one of said block of substitute addresses.

17. The method according to claim 8, wherein changing said used one of said block of substitute addresses comprises coordinating changes in a name-to-address database and a host identity-to-address database.

18. The method according to claim 1, wherein detecting comprises tracing said user when said attempted address corresponds to said unused one of said block of substitute addresses.

19. The method according to claim 18, comprising blocking additional unauthorized attempts when said attempted address corresponds to said unused one of said block of substitute addresses.

20. The method according to claim 1, wherein unused ones of said block of substitute addresses correspond to attack detectors.

21. The method of claim 1, wherein said group of unused substitute address is both user-specific and address-request-time-specific.

22. The method of claim 1, further comprising:
generating a new substitute return address for said target address after an expiration time has elapsed, wherein the expiration time is based on an expected session time for services associated with the address.

23. A non-transitory computer-readable medium containing instructions for controlling a processor to detect unauthorized access attempts to a network by:
receiving a request from a user at a user address to obtain a target address;
obtaining said target address;
generating a substitute return address corresponding to output of a function applied to said target address, said substitute return address and to said user address corresponding to a used one of a block of substitute addresses;
returning said substitute return address to said user;
monitoring access to said target address; and
detecting an unauthorized attempt to access said target address when an attempted address corresponds to at least one unused substitute address of a group of unused substitute addresses in said block of substitute addresses, wherein said group of unused substitute addresses is user-specific.

24. The non-transitory computer-readable medium of claim 23, further comprising instructions for controlling the processor to apply said function by hashing a time of said request to obtain one value of a range of values mapping to said block of substitute addresses, said one value designating said used one of said block of substitute addresses.

25. The non-transitory computer-readable medium of claim 23, further comprising instructions for controlling the processor to detect said unauthorized attempt by tracing said user when said attempted address corresponds to said unused one of said block of substitute addresses.

26. The non-transitory computer-readable medium of claim 25, further comprising instructions for controlling the processor to detect said unauthorized attempt by blocking additional unauthorized attempts when said attempted address corresponds to said unused one of said block of substitute addresses.

27. The non-transitory computer-readable medium of claim 23, further comprising instructions for controlling the processor to apply said function by changing said used one of said block of substitute addresses over time.

28. The non-transitory computer-readable medium of claim 27, further comprising instructions for controlling the processor to change said used one of said block of substitute addresses over time by at least one of determining a time period using a pre-selected time period and determining a time period by generating a random time period.

29. The non-transitory computer-readable medium of claim 27, further comprising instructions for controlling the processor to change said used one of said block of substitute addresses by randomly choosing said used one from said block of substitute addresses.

30. The non-transitory computer-readable medium of claim 27, further comprising instructions for controlling the processor to determine said attempt is authorized by determining that a connection exists between said user and said unused one of said block of substitute addresses.

31. The non-transitory computer-readable medium of claim 27, further comprising instructions for controlling the processor to change said used one of said block of substitute addresses by coordinating changes in a name-to-address database and a host identity-to-address database.

32. A system for detecting unauthorized access attempts to a network, comprising:
means for receiving a request from a user at a user address to obtain a target address;
means for obtaining said target address;
means for generating a substitute return address corresponding to output of a function applied to said target address, said substitute return address corresponding to a used one of a block of substitute addresses and to said user address, said means for generating including a processor programmed to apply said function to said target address and to said user address;
means for returning said substitute return address to said user;
means for monitoring access to said target address; and
means for detecting an unauthorized attempt to access said target address when an attempted address corresponds to at least one unused substitute address of a group of unused substitute addresses in said block of substitute addresses, wherein said group of unused substitute addresses is user-specific.

33. The system of claim 32, wherein said means for generating further comprises means for hashing a time of said request to obtain one value of a range of values mapping to said block of substitute addresses, said one value designating said used one of said block of substitute addresses.

34. The system of claim 32, wherein said means for detecting further comprise means for tracing said user when said attempted address corresponds to said unused one of said block of substitute addresses.

35. The system of claim 34, wherein said means for detecting further comprise means for blocking additional unauthorized attempts when said attempted address corresponds to said unused one of said block of substitute addresses.

36. The system of claim 32, wherein said means for generating further comprise means for changing said used one of said block of substitute addresses over time.

37. The system of claim 36, wherein said means for changing further comprise at least one of means for determining a time period using a pre-selected time period and means for determining a time period by generating a random time period.

38. The system of claim 36, wherein said means for changing further comprise means for randomly choosing said used one from said block of substitute addresses.

39. The system of claim 36, further comprising means for determining said attempt is authorized when a connection exists between said user and said unused one of said block of substitute addresses.

40. The system of claim 36, further comprising:
a name-to-address database;
a host identity-to-address database; and
means for coordinating changes in said name-to-address database and said host identity-to-address database in conjunction with said means for changing.

41. A computer program, disposed on a non-transitory computer-readable medium, for enabling detection of unauthorized access attempts to a network, said computer program including instructions for causing a processor to:
receive a request from a user at a user address to obtain a target address;
obtain said target address;
generate a substitute return address corresponding to output of a function applied to said target address and to said user address, said substitute return address corresponding to a used one of a block of substitute addresses;
return said substitute return address to said user;
monitor access to said target address; and
detect an unauthorized attempt to access said target address when an attempted address corresponds to at least one unused substitute address of a group of unused substitute addresses in said block of substitute addresses, wherein said group of unused substitute addresses is user-specific.

42. The computer program of claim 41, wherein said instructions for causing the processor to generate said substitute return address further include instructions for causing a processor to hash a time of said request to obtain one value of a range of values mapping to said block of substitute addresses, said one value designating said used one of said block of substitute addresses.

43. The computer program of claim 42, wherein said instructions for causing the processor to detect further include instructions for causing a processor to trace said user when said attempted address corresponds to said unused one of said block of substitute addresses.

44. The computer program of claim 43, further including instructions for causing the processor to block additional unauthorized attempts when said attempted address corresponds to said unused one of said block of substitute addresses.

45. The computer program of claim 43, further including instructions for causing the processor to correspond said unused ones of said block of substitute addresses with attack detectors.

46. The computer program of claim 41, wherein said instructions for causing the processor to generate said substitute return address further include instructions for causing a processor to change said used one of said block of substitute addresses over time.

47. The computer program of claim 46, wherein said instructions for causing the processor to generate said substitute return address further include instructions for causing a processor to at least one of use a pre-selected time period for changing said one of said block of substitute addresses and generate a random time period for changing said one of said block of substitute addresses.

48. The computer program of claim 46, wherein said instructions for causing the processor to change said used one of said block of substitute addresses further include instructions for causing a processor to randomly choose said used one from said block of substitute addresses.

49. The computer program of claim 46, wherein said instructions for causing the processor to detect further include instruction for causing a processor to trace said user when said attempted address corresponds to said unused one of said block of substitute addresses.

50. The computer program of claim 49, further including instructions for causing the processor to block additional unauthorized attempts when said attempted address corresponds to said unused one of said block of substitute addresses.

51. The computer program of claim 49, further including instructions for causing the processor to correspond attack detectors with unused ones of said block of substitute addresses.

52. The computer program of claim 46, further including instructions for causing the processor to determine said attempt is authorized when a connection exists between said user and said unused one of said block of substitute addresses.

53. The computer program of claim 46, further including instructions for causing the processor to coordinate said change in a name-to-address database and a host identity-to-address database.

54. The computer program of claim 41, wherein said instructions for causing the processor to detect further include instructions for causing a processor to trace said user when said attempted address corresponds to said unused one of said block of substitute addresses.

55. The computer program of claim 54, further including instructions for causing the processor to block additional unauthorized attempts when said attempted address corresponds to said unused one of said block of substitute addresses.

56. The computer program of claim 41, further including instructions for causing the processor to correspond attack detectors with unused ones of said block of substitute addresses.

* * * * *